US012580930B2

(12) United States Patent
Sethi et al.

(10) Patent No.: US 12,580,930 B2
(45) Date of Patent: Mar. 17, 2026

(54) SECURE EDGE COMPUTING NETWORK MANAGEMENT

(71) Applicant: Dell Products L.P., Round Rock, TX (US)

(72) Inventors: Parminder Singh Sethi, Ludhiana (IN); Shree Rathinasamy, Round Rock, TX (US); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 18/486,475

(22) Filed: Oct. 13, 2023

(65) Prior Publication Data

US 2025/0126134 A1     Apr. 17, 2025

(51) Int. Cl.
*H04L 9/40*                (2022.01)
(52) U.S. Cl.
CPC ................................ *H04L 63/1416* (2013.01)
(58) Field of Classification Search
CPC .............................................. H04L 63/1416
USPC ......................................................... 726/23
See application file for complete search history.

(56) References Cited

U.S. PATENT DOCUMENTS

| | | | | |
|---|---|---|---|---|
| 9,699,205 | B2 * | 7/2017 | Muddu | ............... G06F 3/04842 |
| 11,924,241 | B1 * | 3/2024 | Lakshmanan | ....... H04L 63/1416 |
| 11,977,655 | B2 * | 5/2024 | Jhang | ...................... G06F 16/25 |
| 2021/0021619 | A1 * | 1/2021 | Smith | ................... H04L 63/145 |
| 2022/0124486 | A1 * | 4/2022 | Andrews | ............... H04W 12/71 |
| 2022/0294854 | A1 * | 9/2022 | Tikhomirov | ............ H04L 67/34 |
| 2022/0327007 | A1 * | 10/2022 | Adogla | ................... H04L 67/10 |
| 2023/0177153 | A1 * | 6/2023 | Huang | ............... H04L 63/1416 |
| | | | | 726/23 |
| 2024/0305662 | A1 * | 9/2024 | Kairali | ............... H04L 63/0236 |
| 2024/0406190 | A1 * | 12/2024 | Chihaia | .............. H04L 63/1433 |

OTHER PUBLICATIONS

Wikipedia, "Edge Computing," https://en.wikipedia.org/w/index. php?title=Edge_computing&oldid=1159916267, Jun. 13, 2023, 7 pages.
P. Maymounkov et al., "Kademlia: A Peer-to-Peer Information System Based on the XOR Metric," International Workshop on Peer-to-Peer Systems, (IPTPS), Mar. 7-8, 2002, pp. 53-65.

(Continued)

*Primary Examiner* — Badri Narayanan Champakesan
(74) *Attorney, Agent, or Firm* — Ryan, Mason & Lewis, LLP

(57)                ABSTRACT

Techniques are disclosed for secure edge computing network management in information processing systems. For example, a processing platform comprises at least one processor coupled to at least one memory and is configured to determine that a given edge node has joined an edge computing network comprising a plurality of edge nodes. The processing platform is further configured to determine that security data associated with at least one of the plurality of edge nodes is suitable for the given edge node. The processing platform is further configured to cause a transfer of the security data from the at least one of the plurality of edge nodes, determined to be suitable for the given edge node, to the given edge node.

20 Claims, 7 Drawing Sheets

(56)     References Cited

OTHER PUBLICATIONS

D. Adib, "What is Edge Computing?" https://stlpartners.com/articles/edge-computing/what-is-edge-computing/, Accessed, Jan. 21, 2022, 10 pages.

S. J. Bigelow, "What is Edge Computing? Everything you Need to Know," https://www.techtarget.com/searchdatacenter/definition/edge-computing, Accessed Jan. 19, 2022, 11 pages.

J. Ledesma, "IDS vs. IPS: What Organizations Need to Know," https://www.varonis.com/blog/ids-vs-ips#:~:text=An%20intrusion%20detection%20system%20is,further%20movement%20in%20a%20network., Jun. 30, 2022, 14 pages.

Checkpoint, "Intrusion Detection System (IDS) Vs Intrusion Prevention System (IPS)," https://www.checkpoint.com/cyber-hub/network-security/what-is-an-intrusion-detection-system-ids/ids-vs-ips/, Accessed Oct. 13, 2023, 5 pages.

* cited by examiner

100

MULTI-CLOUD COMPUTING NETWORK 103

CLOUD COMPUTING SITE 102-1
CLOUD-HOSTED APPLICATION(S) 108-1

⋮

CLOUD COMPUTING SITE 102-M
CLOUD-HOSTED APPLICATION(S) 108-M

COMMUNICATION NETWORK(S) 112

EDGE COMPUTING NETWORK 105

EDGE COMPUTING SITE 104-1
EDGE-HOSTED APPLICATION(S) 110-1

EDGE DEVICE 106-1

⋮

EDGE DEVICE 106-P

EDGE COMPUTING SITE 104-N
EDGE-HOSTED APPLICATION(S) 110-N

EDGE DEVICE 106-P+1

⋮

EDGE DEVICE 106-Q

300

304

NEW
EDGE
NODE

302

EXISTING
EDGE
NODE

310

STORE METADATA FOR EDGE
COMPUTING NETWORK AND
RESOURCES

CYBERATTACK(S)

312

STORE LEARNED DATA FROM
ONE OR MORE
CYBERATTACKS

314

USE LEARNED DATA TO
TRAIN SECURITY MODEL OR
OTHERWISE OBTAIN SAME

316

ESTABLISH COMMUNICATION (AND
RESOURCE DATA TRANSFER)

318

TRANSFER PRE-TRAINED
MODEL AND/OR OTHER
LEARNED DATA (AND
TOPOLOGY METADATA)

400

EDGE NODE/
NETWORK COMPONENT

METADATA COMPONENT     410

EDGE-TO-EDGE
COMMUNICATION COMPONENT     412

DISTRIBUTED LOOKUP TABLE
STRUCTURE FOR EDGE
NODE METADATA     416

LEARNING COMPONENT     414

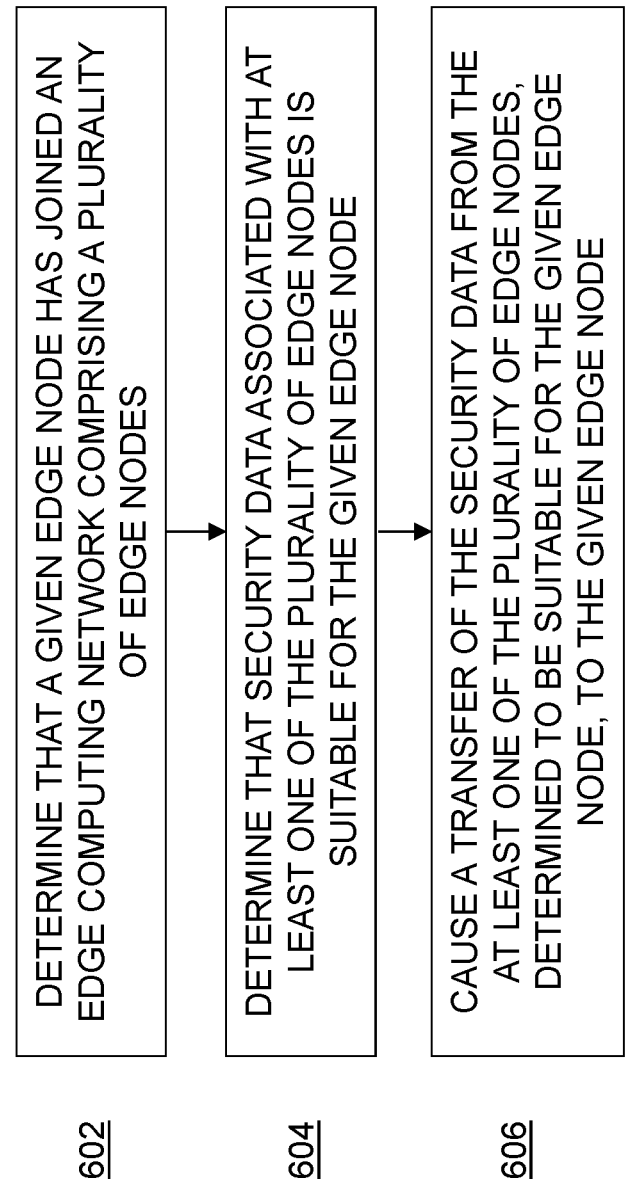

600

602 DETERMINE THAT A GIVEN EDGE NODE HAS JOINED AN EDGE COMPUTING NETWORK COMPRISING A PLURALITY OF EDGE NODES

604 DETERMINE THAT SECURITY DATA ASSOCIATED WITH AT LEAST ONE OF THE PLURALITY OF EDGE NODES IS SUITABLE FOR THE GIVEN EDGE NODE

606 CAUSE A TRANSFER OF THE SECURITY DATA FROM THE AT LEAST ONE OF THE PLURALITY OF EDGE NODES, DETERMINED TO BE SUITABLE FOR THE GIVEN EDGE NODE, TO THE GIVEN EDGE NODE

FIG. 6

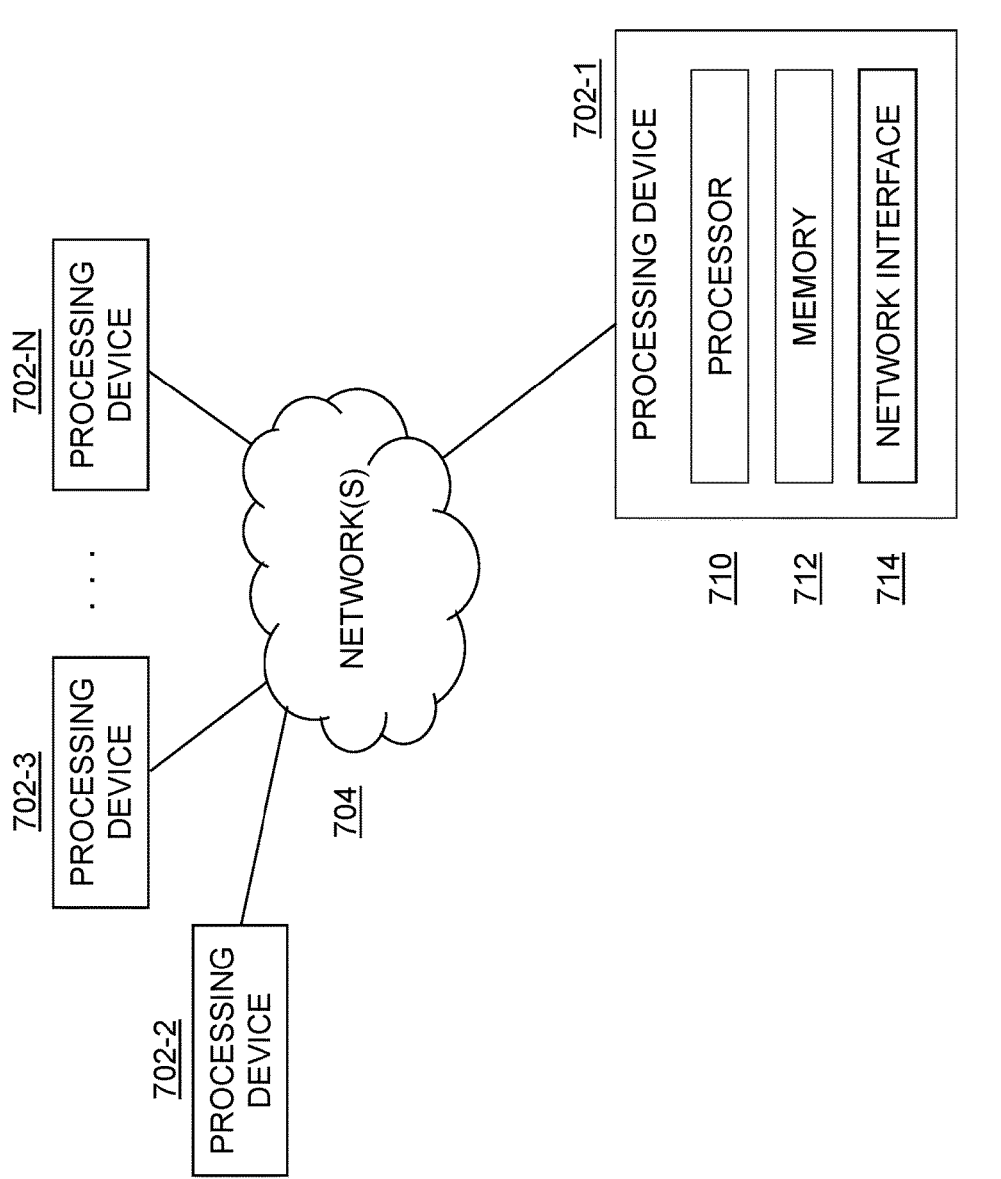
FIG. 7

SECURE EDGE COMPUTING NETWORK MANAGEMENT

FIELD

The field relates generally to information processing systems, and more particularly to management of information processing systems comprising edge computing networks.

BACKGROUND

A distributed machine-to-machine computing network such as, for example, an Internet of Things (IoT) computing environment, can be part of an information processing system. The IoT computing environment typically comprises a plurality of smart devices connected via a communication network in which a large amount of data is transmitted to and from the smart devices.

Edge devices are examples of smart devices with computing power at or near the end-user. Edge computing is a strategy for computing on location where data is collected or used. This strategy allows the data to be processed at the edge of the computing environment rather than sending the data back to a centralized datacenter or cloud computing platform that can also be part of the information processing system.

Thus, edge computing takes place at or near the physical location of the user or source of the data. The edge devices serve as network entry and/or exit points, and are deployed to realize the benefit from enhanced local physical security. However, edge computing networks are responsible for connecting local area networks to external networks and thus can be vulnerable to cyberattacks.

SUMMARY

Illustrative embodiments provide techniques for secure edge computing network management in information processing systems.

For example, in one illustrative embodiment, a processing platform comprises at least one processor coupled to at least one memory and is configured to determine that a given edge node has joined an edge computing network comprising a plurality of edge nodes. The processing platform is further configured to determine that security data associated with at least one of the plurality of edge nodes is suitable for the given edge node. The processing platform is further configured to cause a transfer of the security data from the at least one of the plurality of edge nodes, determined to be suitable for the given edge node, to the given edge node.

Further illustrative embodiments are provided in the form of a non-transitory computer-readable storage medium having embodied therein executable program code that when executed by at least one processor causes the at least one processor to perform the above-mentioned operations. Still further illustrative embodiments comprise methodologies performed by a processing platform comprising at least one processor coupled to at least one memory.

Advantageously, illustrative embodiments provide, inter alia, automatic deployment of edge nodes installed with a suitable secure-ready model.

These and other features and advantages of embodiments described herein will become more apparent from the accompanying drawings and the following detailed description.

BRIEF DESCRIPTION OF DRAWINGS

FIG. 6 illustrates a secure edge computing network management methodology according to an illustrative embodiment.

FIG. 7 illustrates a processing platform for implementing a secure edge computing environment management methodology according to an illustrative embodiment.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising edge and cloud computing environments, as well as other types of processing systems comprising various combinations of physical and virtual processing resources. An information processing system may therefore comprise, for example, at least one data center or other cloud-based system that includes one or more clouds, e.g., multi-cloud computing network, hosting multiple tenants that share cloud resources, as well as one or more edge computing networks as will be further explained. Numerous different types of enterprise computing and storage systems are also encompassed by the term "information processing system" as that term is broadly used herein.

As mentioned above, edge computing networks are typically vulnerable to cyberattacks that target one or more edge devices. One reason is because the edge computing network is typically slow to respond to an attack. Illustrative embodiments address this and other technical challenges with respect to edge computing networks by providing secure edge computing management functionalities that comprise a framework to securely deploy edge devices with a pre-trained security model, e.g., an intrusive detection system (IDS) model, an intrusion prevention system (IPS) model, and/or the like. More particularly, the framework learns the environment and identifies neighborhood edge devices and stores metadata information regarding resources and edge devices. Since edge devices are more exposed to attacks, the framework learns from the attacks and stores the attack information. When any new edge device is deployed, the framework determines the most suitable existing edge device and transfers the model trained from the learned information to the newly deployed edge device (note that an edge device may also illustratively be referred to as an edge node).

Prior to describing further details of secure edge computing management functionalities according to illustrative embodiments, some exemplary information processing system environments with which secure edge computing network management functionalities can be implemented will be described in the context of FIGS. 1 and 2.

By way of example only, FIG. 1 illustrates an information processing system environment 100 configured with an edge computing network is depicted. The information processing system environment 100 is illustratively assumed to be implemented across multiple processing platforms as will be further described below.

The information processing system environment 100 comprises a set of cloud computing sites 102-1, . . . 102-M (collectively, cloud computing sites 102) that collectively comprise a multi-cloud computing network 103. Information processing system environment 100 also comprises a set of edge computing sites 104-1, . . . 104-N (collectively, edge computing sites 104, also referred to as edge computing nodes or edge servers) that collectively comprise at least a portion of an edge computing network 105. The cloud computing sites 102, also referred to as cloud data centers, are assumed to comprise a plurality of cloud devices or cloud nodes (not shown in FIG. 1) that run sets of cloud-hosted applications 108-1, . . . 108-M (collectively, cloud-hosted applications 108). Each of the edge computing sites 104 is assumed to comprise compute infrastructure or edge assets (not shown in FIG. 1) that run sets of edge-hosted applications 110-1, . . . 110-N (collectively, edge-hosted applications 110). As used herein, the term "application" is intended to be broadly construed to include applications, microservices, and other types of services.

Information processing system environment 100 also includes a plurality of edge devices that are coupled to each of the edge computing sites 104 as part of edge computing network 105. A set of edge devices 106-1, . . . 106-P are coupled to edge computing site 104-1, and a set of edge devices 106-P+1, . . . 106-Q are coupled to edge computing site 104-N. The edge devices 106-1, . . . 106-Q are collectively referred to as edge devices 106. Edge devices 106 may comprise, for example, physical computing devices such as Internet of Things (IoT) devices, smart devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

Edge devices 106 in some embodiments comprise respective processing devices associated with a particular company, organization or other enterprise. In addition, at least portions of information processing system environment 100 may also be referred to herein as collectively comprising an "enterprise." Numerous other operating scenarios involving a wide variety of different types and arrangements of processing nodes are possible, as will be appreciated by those skilled in the art.

Note that the number of different components referred to in FIG. 1, e.g., M, N, P, Q, can each be different numbers or some of them the same numbers. Embodiments illustrated herein are not intended to be limited to any particular numbers of components.

As shown in FIG. 1, edge computing sites 104 are connected to cloud computing sites 102 via one or more communication networks 112 (also referred to herein as networks 112). Although not explicitly shown, edge devices 106 may be coupled to the edge computing sites 104 via networks 112. Networks 112 coupling the cloud computing sites 102, edge computing sites 104 and edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network couples edge devices 106 to edge computing sites 104, while a second type of network couples the edge computing sites 104 to the cloud computing sites 102. Various other examples are possible.

In some embodiments, one or more of cloud computing sites 102 and one or more of edge computing sites 104 collectively provide at least a portion of an information technology (IT) infrastructure operated by an enterprise, where edge devices 106 are operated by users of the enterprise. The IT infrastructure comprising cloud computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of cloud computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operate one or more cloud computing sites 102.

Although not explicitly shown in FIG. 1, one or more input-output devices such as keyboards, displays or other types of input-output devices may be used to support one or more user interfaces to each of cloud computing sites 102, edge computing sites 104 and edge devices 106, as well as to support communication between each of cloud computing sites 102, edge computing sites 104, edge devices 106, and other related systems and devices not explicitly shown.

As noted above, cloud computing sites 102 host cloud-hosted applications 108 and edge computing sites 104 host edge-hosted applications 110. Edge devices 106 may exchange information with cloud-hosted applications 108 and/or edge-hosted applications 110. For example, edge devices 106 or edge-hosted applications 110 may send information to cloud-hosted applications 108. Edge devices 106 or edge-hosted applications 110 may also receive information (e.g., such as instructions) from cloud-hosted applications 108.

Figure 1:
FIG. 1 illustrates an information processing system environment with which secure edge computing network management functionalities according to one or more illustrative embodiments can be implemented.

It should be noted that, in some embodiments, requests and responses or other information may be routed through multiple edge computing sites. While FIG. 1 shows an embodiment where each edge computing site 104 is connected to cloud computing sites 102 via the networks 112, this is not a requirement. In other embodiments, one or more of edge computing sites 104 may be connected to one or more of cloud computing sites 102 via one or more other ones of edge computing sites 104 (e.g., edge computing sites 104 may be arranged in a hierarchy with multiple levels, possibly including one or more edge data centers that couple edge computing sites 104 with cloud computing sites 102).

It is to be appreciated that multi-cloud computing network 103, edge computing network 105, and edge devices 106 may be collectively and illustratively referred to herein as a "multi-cloud edge platform." In some embodiments, edge computing network 105 and edge devices 106 are considered a "distributed edge system."

In some embodiments, edge data from edge devices 106 may be stored in a database or other data store (not shown), either locally at edge computing sites 104 and/or in a processed or transformed format at different endpoints (e.g., cloud computing sites 102, edge computing sites 104, other ones of edge devices 106, etc.). The database or other data store may be implemented using one or more storage systems that are part of or otherwise associated with one or more of cloud computing sites 102, edge computing sites 104, and edge devices 106. By way of example only, the storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Cloud computing sites 102, edge computing sites 104, and edge devices 106 in the FIG. 1 embodiment are assumed to be implemented using processing devices, wherein each such processing device generally comprises at least one processor and an associated memory.

It is to be appreciated that the particular arrangement of cloud computing sites 102, edge computing sites 104, edge devices 106, cloud-hosted applications 108, edge-hosted applications 110, and communications networks 112 illustrated in the FIG. 1 embodiment is presented by way of example only, and alternative arrangements can be used in other embodiments.

It is to be understood that the particular set of components shown in FIG. 1 is presented by way of illustrative example only, and in other embodiments additional or alternative components may be used. Thus, another embodiment may include additional or alternative systems, devices and other network entities, as well as different arrangements of modules and other components.

Cloud computing sites 102, edge computing sites 104, edge devices 106, and other components of the information processing system environment 100 in the FIG. 1 embodiment are assumed to be implemented using one or more processing platforms each comprising one or more processing devices having a processor coupled to a memory. Such processing devices can illustratively include particular arrangements of compute, storage, and network resources.

Cloud computing sites 102, edge computing sites 104, edge devices 106, or components thereof, may be implemented on respective distinct processing platforms, although numerous other arrangements are possible. For example, in some embodiments at least portions of edge devices 106, and edge computing sites 104 may be implemented on the same processing platform. One or more of edge devices 106 can therefore be implemented at least in part within at least one processing platform that implements at least a portion of edge computing sites 104. In other embodiments, one or more of edge devices 106 may be separated from but coupled to one or more of edge computing sites 104. Various other component coupling arrangements are contemplated herein.

The term "processing platform" as used herein is intended to be broadly construed so as to encompass, by way of illustration and without limitation, multiple sets of processing devices and associated storage systems that are configured to communicate over one or more networks. For example, distributed implementations of information processing system environment 100 are possible, in which certain components of the system reside in one data center in a first geographic location while other components of the system reside in one or more other data centers in one or more other geographic locations that are potentially remote from the first geographic location. Thus, it is possible in some implementations of the system for cloud computing sites 102, edge computing sites 104, and edge devices 106, or portions or components thereof, to reside in different data networks. Distribution as used herein may also refer to functional or logical distribution rather than to only geographic or physical distribution. Numerous other distributed implementations are possible.

In some embodiments, information processing system environment 100 may be implemented in part or in whole using a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers.

In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Kubernetes has become the prevalent container orchestration system for managing containerized workloads and has been adopted by many enterprise-based IT organizations to deploy its application programs (applications) and edge computing networks. While the Kubernetes container orchestration system is mentioned as an illustrative implementation, it is to be understood that alternative deployment systems, as well as information processing systems other than container-based systems, can be utilized.

It is to be further appreciated that illustrative embodiments are not limited to the FIG. 1 embodiment or any particular edge computing implementation but rather can be implemented with any information processing system environment that would benefit from efficient design and deployment functionalities described herein.

Figure 2:
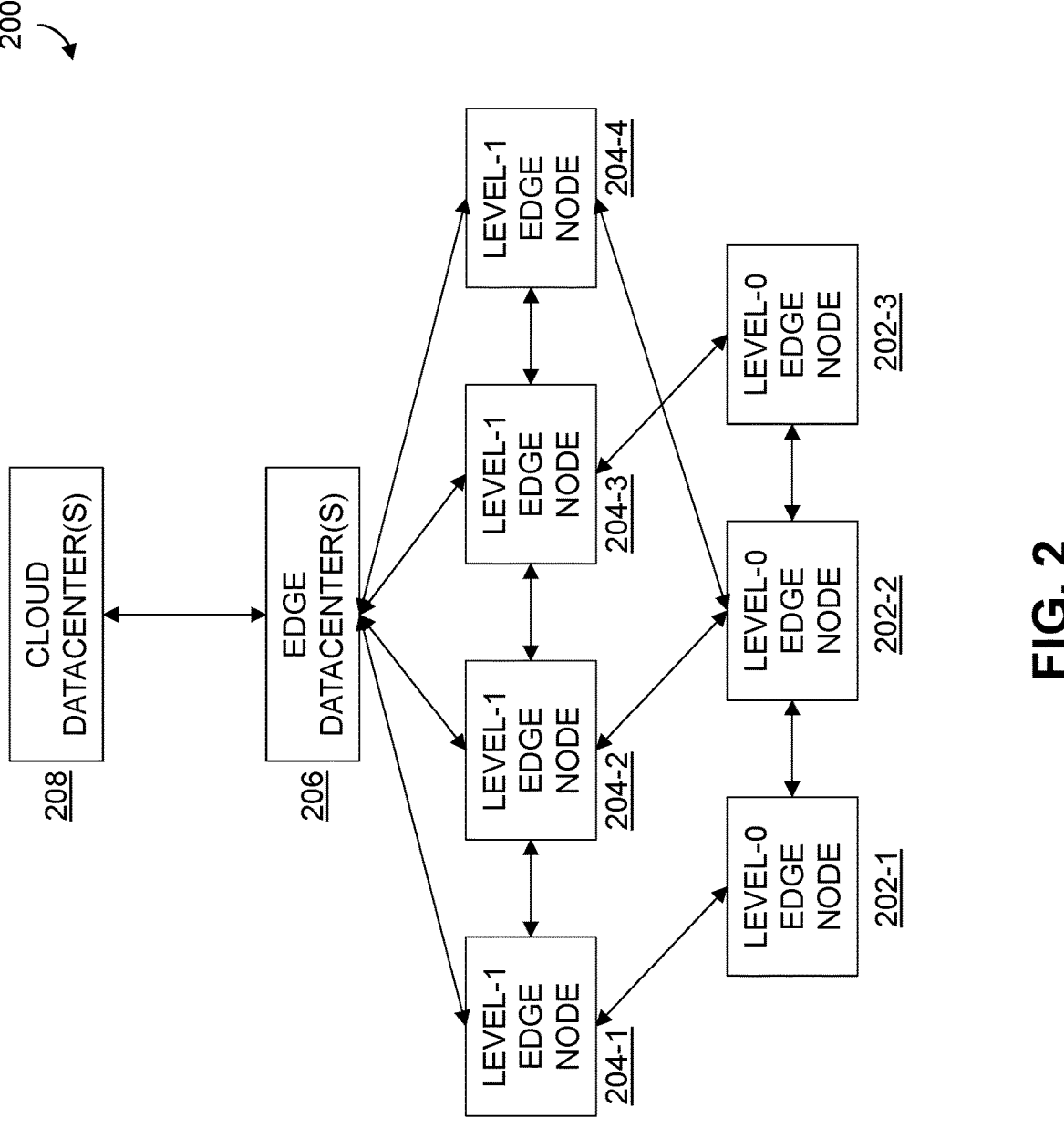
FIG. 2 illustrates another information processing system environment with which secure edge computing management functionalities according to one or more illustrative embodiments can be implemented.

Referring now to FIG. 2, an information processing system environment 200 configured with an edge computing network is depicted. The information processing system environment 200 is illustratively assumed to be implemented across multiple processing platforms as will be further described below.

The information processing system environment 200 comprises a first set (level-0) of edge nodes 202-1, 202-2, and 202-3 (collectively referred to as level-0 edge nodes 202) operatively coupled to a second set (level-1) of edge nodes 204-1, 204-2, 204-3, and 204-4 (collectively referred to as level-1 edge nodes 204). The level-1 edge nodes 204 are operatively coupled to one or more edge datacenters 206, which are operatively coupled to one or more cloud datacenters 208.

In some illustrative embodiments, some or all of the one or more edge datacenters 206 can be considered to correspond to some or all of the edge computing sites 104 in FIG. 1, while some or all of the level-0 edge nodes 202 and level-1 edge nodes 204 can be considered to correspond to some or all of the edge devices 106 in FIG. 1. In other illustrative embodiments, some or all of level-1 edge nodes 204 can alternatively be considered to correspond to some or all of the edge computing sites 104 in FIG. 1. In illustrative descriptions herein, level-1 edge nodes 204 can also be referred to as "neighborhood" edge nodes.

Figure 3:
FIG. 3 illustrates a secure edge computing network management workflow according to an illustrative embodiment.
Figure 4:
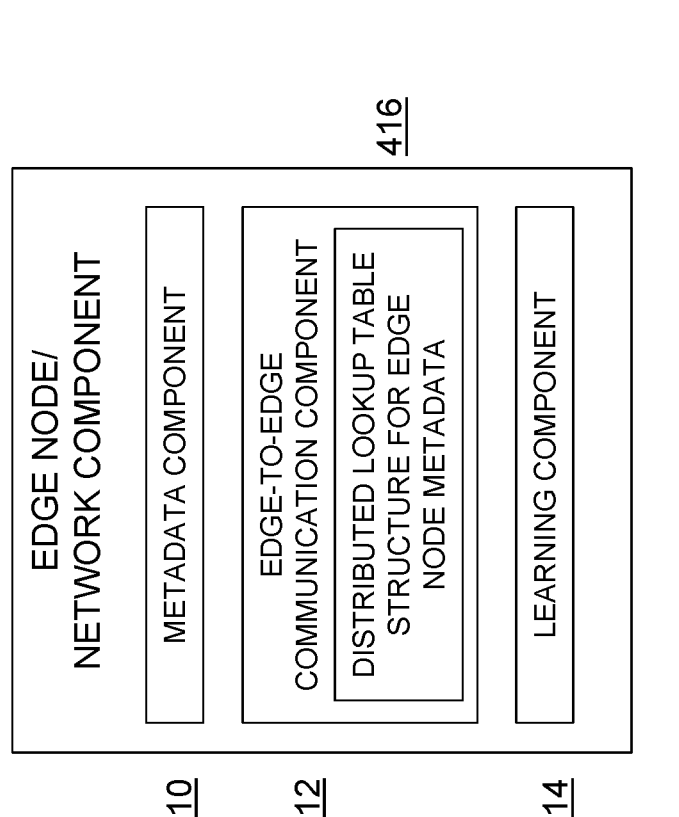
FIG. 4 illustrates an edge node architecture configured with secure edge computing network management functionalities according to an illustrative embodiment.

Given the above-described illustrative embodiments of information processing system environments with edge computing networks in FIGS. 1 and 2, secure edge computing network management functionalities will now be illustratively described in the context of FIGS. 3 and 4.

FIG. 3 illustrates a secure edge computing network management workflow 300 (referred to simply herein as workflow 300) according to an illustrative embodiment. As shown, workflow 300 involves two edge nodes, an existing edge node 302 (i.e., previously deployed and operating in an edge computing network) and a new edge node 304 (i.e., just deployed or to be deployed in the edge computing network). By way of example only, assume that existing edge node 302 is one of the neighborhood or level-1 edge nodes 204 in FIG. 2, while new edge node 304 is one of the level-0 edge nodes 202. It is to be appreciated that existing edge node 302 and new edge node 304 can be any two edge nodes in an edge computing network and not necessarily correspond to edge nodes in FIG. 2.

As shown, in step 310 of workflow 300, existing edge node 302 stores metadata that is descriptive of the existing topology of the edge computing network in which it is deployed. This data can be collected by existing edge node 302 at the time it is deployed and updated as appropriate as existing edge node 302 operates in the edge computing network. Such metadata may comprise information about some or all of the other edge nodes in the edge computing network as well as resources (e.g., hardware configuration, software configuration, etc.) available at each of the edge nodes.

In step 312, existing edge node 302 stores data learned from one or more previous cyberattacks. Since, existing edge node 302 has been deployed and operating in the edge computing network for some period of time, it is assumed that it has either directly experienced one or more cyberattacks, and thus obtained information regarding the one or more cyberattacks, or has been updated by another edge node or other source (not shown) in the edge computing network with information about the one or more cyberattacks.

In step 314, existing edge node 302 trains a security model using the data learned from the one or more previous cyberattacks. As mentioned above, such a model may comprise an IPS model, an IDS model, and/or any other appropriate type of security model which can be trained by data descriptive of one or more previous cyberattacks in a typical manner. Existing edge node 302 may alternatively obtain the security model, pre-trained using data learned from the one or more previous cyberattacks, from another source such as, but not limited to, another edge node (not shown).

In step 316, existing edge node 302 and new edge node 304 establish communication. It can be assumed that, in some illustrative embodiments, this step is performed as new edge node 304 is being deployed in the edge computing network. Note that, as part of step 316, new edge node 304 also provides existing edge node 302 with its resource information (e.g., hardware configuration, software configuration, etc.) to enable existing edge node 302 to determine whether or not the security model it trained or otherwise obtained in step 314 is suitable for new edge node 304. In some illustrative embodiments, the determination of model suitability comprises existing edge node 302 comparing resources on new edge node 304 with resources on edge nodes (i.e., itself and/or other edge nodes) from which cyberattack data used to train the security model was learned. When the resources match or substantially match, it is determined that the security model is suitable to protect new edge node 304.

In step 318, based on a suitable match determined in step 316, existing edge node 302 transfers the pre-trained security model and/or other learned data to new edge node 304. Also, some or all of the metadata obtained/stored by existing edge node 302 in step 310 can be provided to new edge node 304 in step 318, although new edge node 304 can also collect similar metadata from any one or more other neighborhood edge nodes.

If it is determined that the pre-trained security model at existing edge node 302 is not a suitable match for new edge node 304, existing edge node 302 can notify new edge node 304 (as part of step 316), and new edge node 304 can establish communication with another existing edge node until it finds a suitable security model matching its resources.

It is to be appreciated that once new edge node 304 is deployed and operates in the edge computing network, it too can then serve the same or similar functions as existing edge node 302 (i.e., performs steps 310-318) with respect to another newly deployed edge node. As such, in one or more illustrative embodiments, each edge node in an edge computing network can be comprised with a similar architecture for collecting metadata, training security models, comparing resources, and sharing the trained model.

FIG. 4 illustrates an architecture 400 configured with secure edge computing network management functionalities according to an illustrative embodiment. More particularly, by way of example only, architecture 400 can be implemented in existing edge node 302 and new edge node 304 of FIG. 3, as well as some or all of level-0 edge nodes 202 and level-1 edge nodes 204 of FIG. 2, and/or in a separate edge computing network component. It is to be understood that each edge node/network component has or can have other components not expressly shown in FIG. 4 and that architecture 400 only illustrates components relevant to an understanding of secure edge computing network management functionalities described herein.

As shown, architecture 400 comprises a metadata component 410, an edge-to-edge communication component 412, and a learning component 414. As explained above, each edge node in an edge computing network is configured with these components to identify neighborhood edge nodes and determine if there are any newly deployed edge nodes. The edge node can then determine the best suited pre-trained security model and perform a learning transfer to the newly deployed edge node.

Metadata component 410 is configured, for example, to store, or otherwise manage, data relevant to secure edge computing network management for a given edge node. As mentioned, such data may comprise information about some or all of the other edge nodes in the edge computing network as well as resources (e.g., hardware configuration, software configuration, etc.) available at each of the edge nodes. Such data may also comprise data learned from one or more previous cyberattacks. Such data may be obtained by metadata component 410 at the time the given edge node joins the edge computing network and/or during operation of the given edge node in the edge computing network.

Edge-to-edge communication component 412 manages, in conjunction with metadata component 410, communication between edge nodes in the edge computing network. Further, edge-to-edge communication component 412 is configured to compute and maintain a topological structure of the edge computing network, as well as cause exchange with other edge nodes of information such as, but not limited to, edge node identifiers (IDs), Internet Protocol (IP) addresses, and port numbers that are determined through node lookups.

Thus, by way of example, each edge node obtains (i.e., via edge-to-edge communication component 412) and stores (i.e., via metadata component 410) the information locally exchanged with other edge nodes, and updates it when any new edge node joins the edge computing network. In some illustrative embodiments, information relevant to secure edge computing network management is merged into a single document which is stored in metadata component 410. By way of example only, the document may be in a JavaScript Object Notation (JSON) file format with the node ID as the filename. Edge-to-edge communication component 412 can then obtain the documents of the active edge nodes in the edge computing network and update its local store, i.e., in metadata component 410.

In one non-limiting example, edge-to-edge communication component 412 can comprise an edge communication protocol such as Kademlia. Kademlia is a distributed hash table (DHT) for decentralized peer-to-peer computer networks. A Kademlia network consists of nodes where each of the nodes has a unique 160 bit ID as an identifier. Nodes in the Kademlia network communicate using a User Datagram Protocol (UDP). Moreover, the participating nodes exchange their information through node lookups. An overlay network is formed where each node is identified by its own node ID. Besides the unique ID, it maintains a routing table and a DHT. A routing table maintains a list for each bit of the node ID. A routing table is divided into created lists known as buckets, wherein each bucket contains contact information and the distance from the current node. Contact information resides in one of the buckets which contains the node ID, IP address, and port number of the other node. Buckets in the routing table are updated every time a new node joins the network. In addition, new edge nodes can be bootstrapped by knowing basic contact information of any other reachable DHT nodes in the network. The DHT segment stores key/value pairs where the key is the name of the public metadata document and the value is the network location of the document. As such, Kademlia or the like can be used as the edge communication protocol due to its automatic spreading of contact information. The process of finding nodes and resource descriptions in this type of network is fast and efficient. Kademlia or any communication protocol used can more generally be referred to, as shown in FIG. 4, a distributed lookup table structure for edge node metadata 416.

Learning component 414 is configured to monitor and analyze the network security for edge security with an intrusion detection system (IDS), an intrusion prevention system (IPS), and/or the like. IDS monitors, analyzes, and reports on network events for anomalies and possibly malicious activities (i.e., cyberattacks and the like). IPS also conducts detection but acts against cyberattacks. One or more security models are trained by data obtained from the IDS, IPS, and/or some other source having data relevant to one or more previous cyberattacks and the like.

Figure 5:
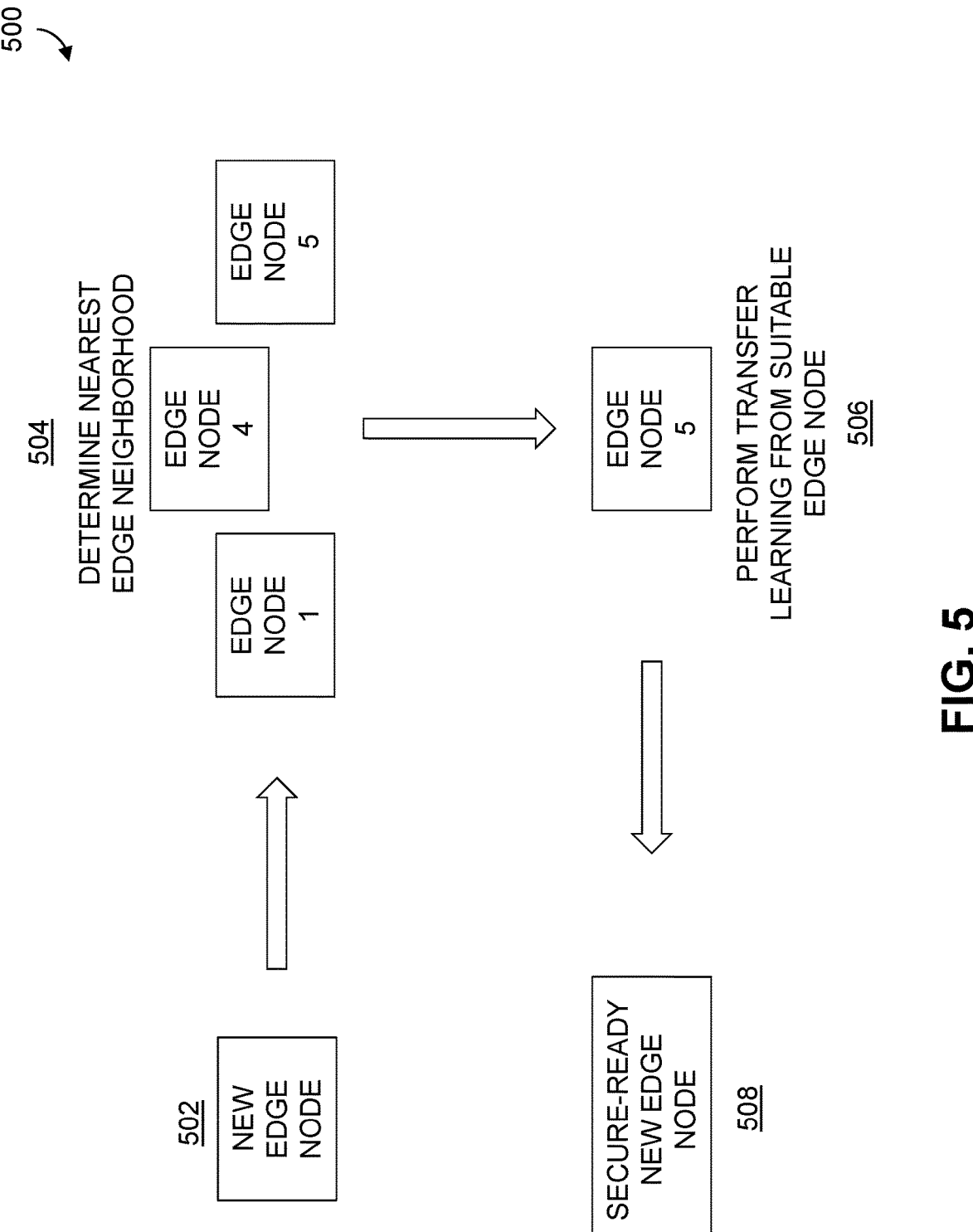
FIG. 5 illustrates a transfer learning process for secure edge computing network management according to an illustrative embodiment.

Given a security model trained on learned data regarding one or more previous cyberattacks as explained above, FIG. 5 illustrates a transfer learning process 500 for secure edge computing network management according to an illustrative embodiment. It is to be appreciated that transfer learning process 500 can be implemented in one or more edge nodes (e.g., learning component 414 of level-0 edge nodes 202, level-1 edge nodes 204 in FIG. 2 and/or the corresponding edge devices 106 and edge computing sites 104 in FIG. 1), and, alternatively or additionally, in a separate edge computing network component (not expressly shown in FIG. 5) operatively coupled to the edge nodes in the edge computing network. In some illustrative embodiments, such a separate edge computing network component can also include a metadata component (e.g., metadata component 410) and an edge-to-edge communication component (e.g., edge-to-edge communication component 412) with the same or similar functionalities as described herein.

With the edge-to-edge communication (e.g., edge-to-edge communication component 412), transfer learning process 500 determines that a new edge node has been deployed (step 502). Based on a determination (step 504) of the neighborhood of nearest edge nodes (e.g., edge nodes 1, 4 and 5) with respect to the new edge node, transfer learning process 500 then determines which edge node of the neighborhood edge nodes has the most suitable pre-trained security model or other learned data (more generally, pre-trained security model or other learned data can be considered security data) that can be used for training the newly deployed edge node, and causes transfer (step 506) of the security model and/or other learned data from that edge node to the new edge node (e.g., from edge node 5 to the new edge node). In some illustrative embodiments, transfer learning can be performed using a Keras trainable application programming interface (API). The new edge node then implements the security model/learned data resulting in a secure-ready new edge node (step 508) which is now trained to prevent or otherwise mitigate any subsequent similar cyber-attacks.

In some illustrative embodiments, parameters that can be used to determine the edge node with the most suitable security model may include, but are not limited to: (i) category of resources (e.g., IoT devices) that are communicating in the edge computing network; (ii) protocol(s) that resources (edge nodes) use to communicate; and/or (iii) frequency of network traffic.

Suitability can be determined by comparing one or more of these parameters for the new edge node against one or more existing edge nodes in the edge computing network. In illustrative embodiments where transfer learning process 500 is implemented in an edge node itself, the edge node can perform the comparison of its parameters against the new edge node to determine whether or not its own security model is suitable for the new edge node, otherwise the edge node can determine other nearest neighbors to the new edge node and either select one based on the parameter comparison or have one of the neighboring edge nodes do the parameter comparison itself. When a separate edge computing network component is performing transfer learning process 500, the separate edge computing network component determines nearest neighbors to the new edge node and selects one based on the parameter comparison.

Note that, in some illustrative embodiments, nearest neighbor edge nodes or edge nodes in a neighborhood of a given edge node can be edge nodes that are geographically close to the given edge node in terms of ease of data routing. Additionally or alternatively, neighboring edge nodes can be edge nodes that have some other common attribute or parameter with the given edge node that would constitute a neighborhood (e.g., similar vendors, similar resources, similar functionalities, etc.).

In one illustrative example, transfer learning process 500 can obtain layers from a previously trained model, freeze those layers, and add new and trainable layers on top of the frozen layers. These new layers learn to turn the old features into predictions on a new data set. The new layers are then trained on the new data set. The resulting model can be fine-tuned if required/desired.

Advantageously, as explained herein, illustrative embodiments provide: (i) automatic deployment of edge devices installed with the best suited secure ready model; (ii) training of newly deployed edge nodes based on the most suitable learning component of the edge computing environment; and/or (iii) a learning component driven edge deployment. Exemplary benefits include, but are not limited to, enhanced edge security by having a secure ready edge deployment with trained intrusion detection system and intrusion prevention system functionalities so as to enable an optimized and appropriate edge deployment resilient to learned security attacks.

FIG. 6 illustrates a secure edge computing network management methodology 600 according to an illustrative embodiment. Step 602 determines that a given edge node has joined an edge computing network comprising a plurality of edge nodes. Step 604 determines that security data associated with at least one of the plurality of edge nodes is suitable for the given edge node. Step 606 causes a transfer of the security data from the at least one of the plurality of edge nodes, determined to be suitable for the given edge node, to the given edge node.

FIG. 7 depicts a processing platform 700 used to implement edge computing management according to an illustrative embodiment. More particularly, processing platform 700 is a processing platform on which a computing environment with functionalities described herein (e.g., FIGS. 1-6 and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only and may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:

a processing platform comprising at least one processor coupled to at least one memory which comprises program instructions that are executed by the at least one processor to cause the processing platform to manage security in an edge computing network comprising a plurality of edge nodes, where the processing platform operates to:

identify a given edge node which has newly joined the edge computing network;

establish communication with the given edge node to obtain resource information with regard to resources of the given edge node including at least one of hardware resources and software resources of the given edge node;

utilize the obtained resource information of the given edge node to determine whether a trained security model, which is implemented by the processing platform for at least one of network intrusion detection and intrusion prevention, can be implemented by the given edge node;

transfer the trained security model and security-related data from the processing platform to the given edge node, in response to determining that the trained security model can be implemented by the given edge node; and identify at least one other edge node of the edge computing network having another trained security model which can be transferred to and implemented by the given edge node, in response to determining that the trained security model of the processing platform cannot be implemented by the given edge node.

2. The apparatus of claim 1, wherein in identifying at least one other edge node of the edge computing network having another trained security model which can be transferred to and implemented by the given edge node, the processing platform operates to determine one or more edge nodes in the edge computing network that are nearest neighbors to the given edge node.

3. The apparatus of claim 2, wherein in identifying at least one other edge node of the edge computing network having another trained security model which can be transferred to and implemented by the given edge node, the processing platform further operates to determine that the other trained security model associated with the one or more edge nodes in the edge computing network, which are nearest neighbors to the given edge node, is suitable for the given edge node by comparing one or more parameters of the given edge node with one or more corresponding parameters of the one or more edge nodes which are the nearest neighbors to the given edge node.

4. The apparatus of claim 1, wherein the processing platform further operates to obtain metadata associated with the plurality of edge nodes in the edge computing network.

5. The apparatus of claim 4, wherein at least a portion of the obtained metadata is utilized to identify the given edge node has joined the edge computing network.

6. The apparatus of claim 4, wherein at least a portion of the obtained metadata is utilized to identify at least one other edge node of the edge computing network having another trained security model which can be transferred to and implemented by the given edge node.

7. The apparatus of claim 1, wherein the processing platform further operates to communicate with each edge node of the plurality of edge nodes in the edge computing network.

8. The apparatus of claim 7, wherein communicating is enabled via a protocol comprising a distributed lookup table structure of data associated with each edge node of the plurality of edge nodes in the edge computing network.

9. The apparatus of claim 1, wherein the trained security model comprises a security model pre-trained based on data associated with one or more previous cyberattacks that occurred in the edge computing network.

10. The apparatus of claim 1, wherein the security-related data transferred to the given edge node comprises data learned from one or more previous cyberattacks that occurred in the edge computing network.

11. The apparatus of claim 1, wherein the security-related data transferred to the given edge node comprises data obtained from one or more of an intrusion detection system and an intrusion prevention system.

12. The apparatus of claim 1, wherein the processing platform is part of at least one edge node of the plurality of edge nodes in the edge computing network.

13. The apparatus of claim 1, wherein the processing platform is part of at least one edge network component associated with the edge computing network.

14. A method, comprising:
managing security of an edge computing network by a plurality of edge nodes operating in the edge computing network, wherein managing security of the edge computing network by the plurality of edge nodes comprises:
identifying, by a first edge node, that a second edge node has newly joined the edge computing network;
establishing, by the first edge node, communication with the second edge node to obtain resource information with regard to resources of the second edge node including at least one of hardware resources and software resources of the second edge node;
utilizing, by the first edge node, the obtained resource information of the second edge node to determine whether a trained security model, which is implemented by the first edge node for at least one of network intrusion detection and intrusion prevention, can be implemented by the second edge node;
transferring, by the first edge node, the trained security model and security-related data to the second edge node, in response to the first edge node determining that the trained security model can be implemented by the second edge node; and
identifying at least one other edge node of the edge computing network having another trained security model which can be transferred to and implemented by the second edge node, in response to determining that the trained security model of the first edge node cannot be implemented by the second edge node.

15. The method of claim 14, wherein identifying at least one other edge node of the edge computing network having another trained security model which can be transferred to and implemented by the second edge node, comprises the first edge node determining one or more edge nodes in the edge computing network that are nearest neighbors to the second edge node.

16. The method of claim 15, wherein identifying at least one other edge node of the edge computing network having another trained security model which can be transferred to and implemented by the second edge node, comprises the first edge node determining that the other trained security model associated with the one or more edge nodes in the edge computing network, which are nearest neighbors to the second edge node, is suitable for the second edge node by comparing one or more parameters of the second edge node with one or more corresponding parameters of the one or more edge nodes which are the nearest neighbors to the second edge node.

17. The method of claim 14, further comprising obtaining, by the first edge node, metadata associated with the plurality of edge nodes in the edge computing network.

18. The method of claim 17, wherein at least a portion of the obtained metadata is utilized by the first edge node to identify at least one other edge node of the edge computing network having another trained security model which can be transferred to and implemented by the second edge node.

19. The method of claim 14, further comprising the first edge node communicating with each edge node of the plurality of edge nodes in the edge computing network via a protocol comprising a distributed lookup table structure of data associated with each edge node of the plurality of edge nodes in the edge computing network.

20. A computer program product comprising a non-transitory processor-readable storage medium having stored therein program code of one or more software programs, wherein the program code, when executed by one or more processors, implements a processing platform that is configured to manage security in an edge computing network comprising a plurality of edge nodes, where the processing platform operates to:
identify a given edge node which has newly joined the edge computing network;
establish communication with the given edge node to obtain resource information with regard to resources of the given edge node including at least one of hardware resources and software resources of the given edge node;
utilize the obtained resource information of the given edge node to determine whether a trained security model, which is implemented by the processing platform for at least one of network intrusion detection and intrusion prevention, can be implemented by the given edge node;

transfer the trained security model and security-related data from the processing platform to the given edge node, in response to determining that the trained security model can be implemented by the given edge node; and identify at least one other edge node of the edge computing network having another trained security model which can be transferred to and implemented by the given edge node, in response to determining that the trained security model of the processing platform cannot be implemented by the given edge node.

\* \* \* \* \*